United States Patent [19]

Arrandale et al.

[11] 3,955,824
[45] May 11, 1976

[54] CHUCK MEMBER INCLUDING FLUID DRAFT

[75] Inventors: Roy S. Arrandale, Elmira; James H. Cady, Horseheads; Leroy C. Hartman, Elmira, all of N.Y.

[73] Assignee: Dart Industries Inc., Los Angeles, Calif.

[22] Filed: Mar. 5, 1975

[21] Appl. No.: 555,664

Related U.S. Application Data

[62] Division of Ser. No. 274,705, July 24, 1972, Pat. No. 3,884,184.

[52] U.S. Cl. .............................. 279/1 R; 118/58; 118/503
[51] Int. Cl.² ........................................ B23B 31/02
[58] Field of Search ............... 118/58, 301, 63, 504, 118/500, 503, 620; 279/1 R; 339/112

[56] References Cited
UNITED STATES PATENTS

| | | | |
|---|---|---|---|
| 1,443,415 | 1/1923 | Jolls | 279/1 M |
| 2,442,183 | 5/1948 | Stearns | 118/620 X |
| 3,030,744 | 4/1962 | Mueller | 51/225 |
| 3,595,109 | 7/1971 | Burroughs et al. | 279/1 |

*Primary Examiner*—Morris Kaplan
*Attorney, Agent, or Firm*—Leigh B. Taylor; Kenneth J. Hovet; Paul R. Wylie

[57] ABSTRACT

Glassware coating apparatus including spraying equipment and a transfer mechanism that assures the uniform application of a thermoplastic polymer on glassware (i.e., bottleware) in a continuous fashion without occurrence of internal contamination. The apparatus, among other things, includes a unique chucking arrangement adapted to seize the ware in the finish area and transfer same through the spraying equipment. Likewise, the apparatus includes provision for fluid purging each bottle during the spraying thereof.

2 Claims, 5 Drawing Figures

FIG.—1

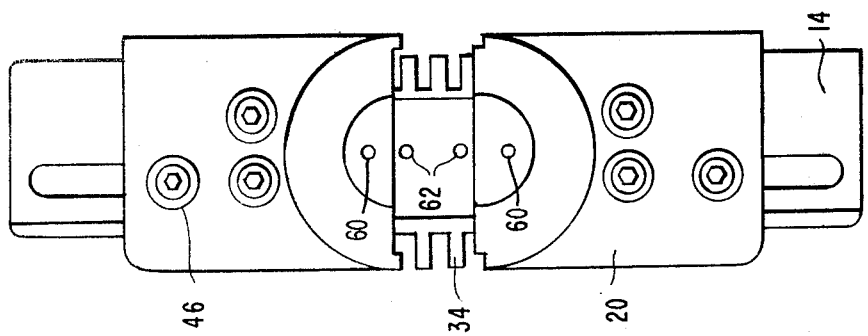
FIG.—4
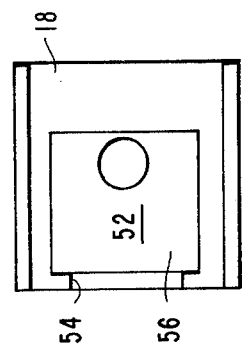
FIG.—5
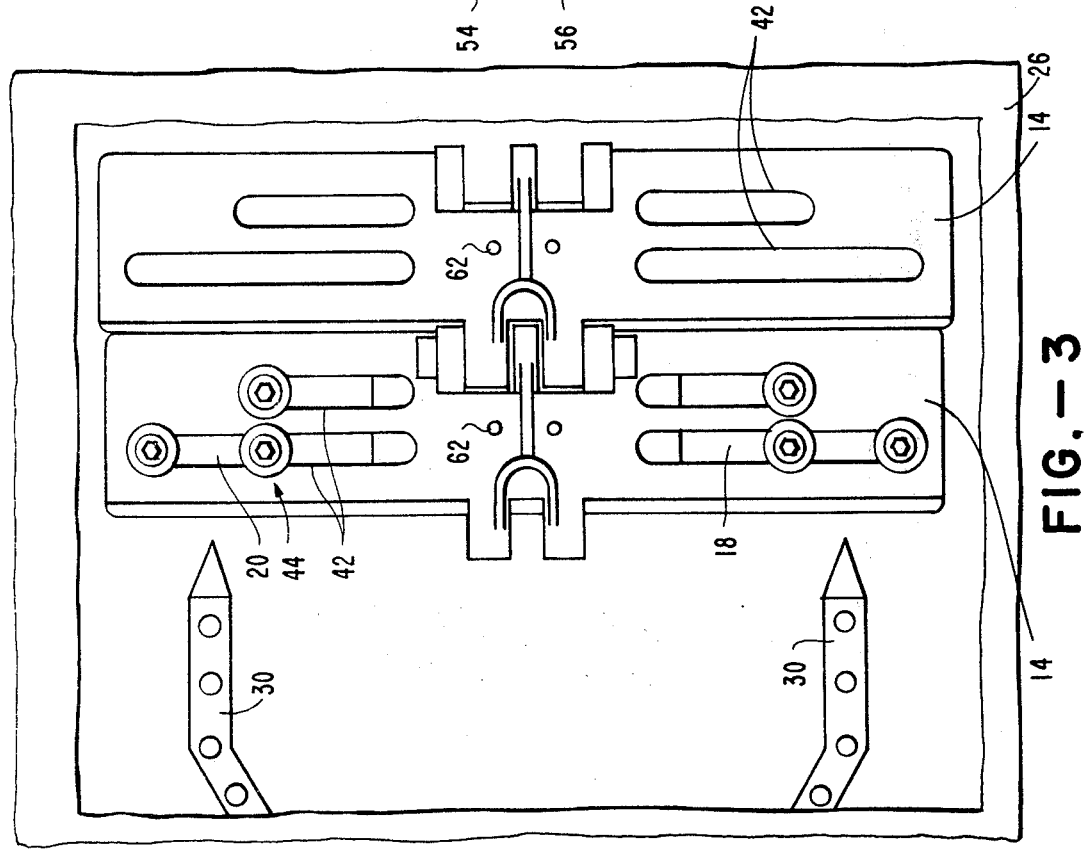
FIG.—3

CHUCK MEMBER INCLUDING FLUID DRAFT

This is a division of application Ser. No. 274,705, filed 7-24-72, now U.S. Pat. No. 3,884,184.

This invention relates to a process and apparatus for coating articles of manufacture and more particularly concerns the production of shatter resistant glassware (i.e., bottleware). In conjunction herewith developments that might more broadly be characterized as article transfer related are described in combination with conventional electrostatic spraying apparatus.

It should be understood that prior art polymer coatings and techniques for the application of same to glassware have long been known and practiced by the industry. These coatings have, however, been employed, for the most part, to protect the basic glass construction from surface abrasions and the like. Such abrasions or other defects substantially reduce the inherent glass strength and therefore obviously subject it to a higher incidence of failure.

The coatings referred to have taken the form of thin protective films bonded to the glass surface and in most respects exhibiting tough but brittle characteristics. These have served well in providing the intended protection and preserving glassware integrity. However, such cannot and do not render ware "shatter resistant" or substantially change the fragmentation characteristics of ware that is broken while under internal pressure.

In the latter respect, it should also be recognized that certain glassware, particularly glass aerosol containers, have been provided with polymeric protective sheaths. These are indicated to be resistive to glass fragmentation under conditions of failure but such have been inapplicable for use in the vast majority of glassware applications. For example, most such coatings are of thicknesses which economically prevent their use or adoption in many fields. Likewise, these have not exhibited criteria which would enable their use in bottling applications where severe cleaning and other processing techniques dictated by the container product are encountered.

The application here considered has therefore been directed primarily to those containerization areas employing internal pressurization where known aerosol techniques are inapplicable. These are principally considered to be carbonated beverage bottles and the like which, of course, due to their pressurized state, are subject to severe fragmentation in certain instances of failure. In reiteration, it should be understood that the film coatings first mentioned above, help in reducing the incidence of failure here discussed but under conditions of failure will not necessarily decrease the severity of fragmentation.

Apparatus for the application of coatings to containers as is here disclosed, establish that certain adhesive characteristics between the glass and polymer envelope dictate the acceptability and applicability for creation of the "shatter resistant" container desired. Similarly, other polymer properties such as elasticity, toughness, etc., contribute to the overall effectiveness of the coating in producing the "shatter resistant" container. Likewise, processing during coating contributes significantly to the creation of a suitably adherent polymer sheath having surface texture, continuity and transparency acceptable to the bottling trade.

The invention contemplates use of thermoplastic polymers as the "shatter resistant" coating and particularly polyethylene polymers and copolymers such as those described in co-pending application Ser. No. 232,589 filed Mar. 7, 1972, now Pat. No. 3,859,117. Such are particulate materials preferably having a particle mesh size range of between about 25 and 125 and a low melt index of between about 1 and 3. It should, however, be understood that melt index may be varied slightly from that preferred depending upon material density and in certain instances where multiple coatings are employed, may be as high as 100.

As indicated, particular apparatus developments have also contributed to the achievement of a "shatter resistant" bottle product. A unique ware transfer mechanism is employed to present the ware to the coating chamber as well as to remove and replace same on typical ware conveyors. Further, and in conjunction with the transfer mechanism employed during actual particulate polymer coating, new bottle chucking devices are employed. These are adapted to grip the heated ware, to hold the ware firmly in a steady upright position through all motions of the transfer mechanism and to fluid purge the ware interior during the coating operation.

Hereinabove and throughout the specification and claims, reference is made to a thermoplastic "shatter resistant" coating. It should be understood that this terminology is employed in the same sense as would phraseology that would infer immunity from substantial fragmentation. More particularly, this is a characteristic exhibited by the thermoplastic coated glassware that has been processed by apparatus more fully described below. It is apparent therefore, that the principal objective of the invention is the production of a "shatter resistant" bottle suitable for use where internal bottle pressurization is anticipated and which, by design and definition, will substantially minimize bottle fragmentation in the event of such a pressurized bottle failure.

It should also be apparent that other significant advantages offered by coated bottles of this type include for example, practical elimination of bottle-to-bottle contact abrasions, considerable reduction in bottle and filling line noise, and enable shipping carton redesign without partitions. In effect, therefore, bottleware produced hereby will incorporate the best properties of glass with those of plastic.

Additional objectives and advantages not enumerated will, however, also become more apparent upon continued reference to the specification, claims and drawing wherein:

FIG. 3 is a bottom biew of a portion of the interconnected links of the high-speed conveyor arrangement taken along line 3—3 in FIG. 1;

FIG. 4 is a top plan view of the bottle chucking arrangement as mounted on a conveyor link and in a partially open position; and FIG. 5 is an end view of one of the chuck sections as seen from the cavity side thereof.

Figure 1:
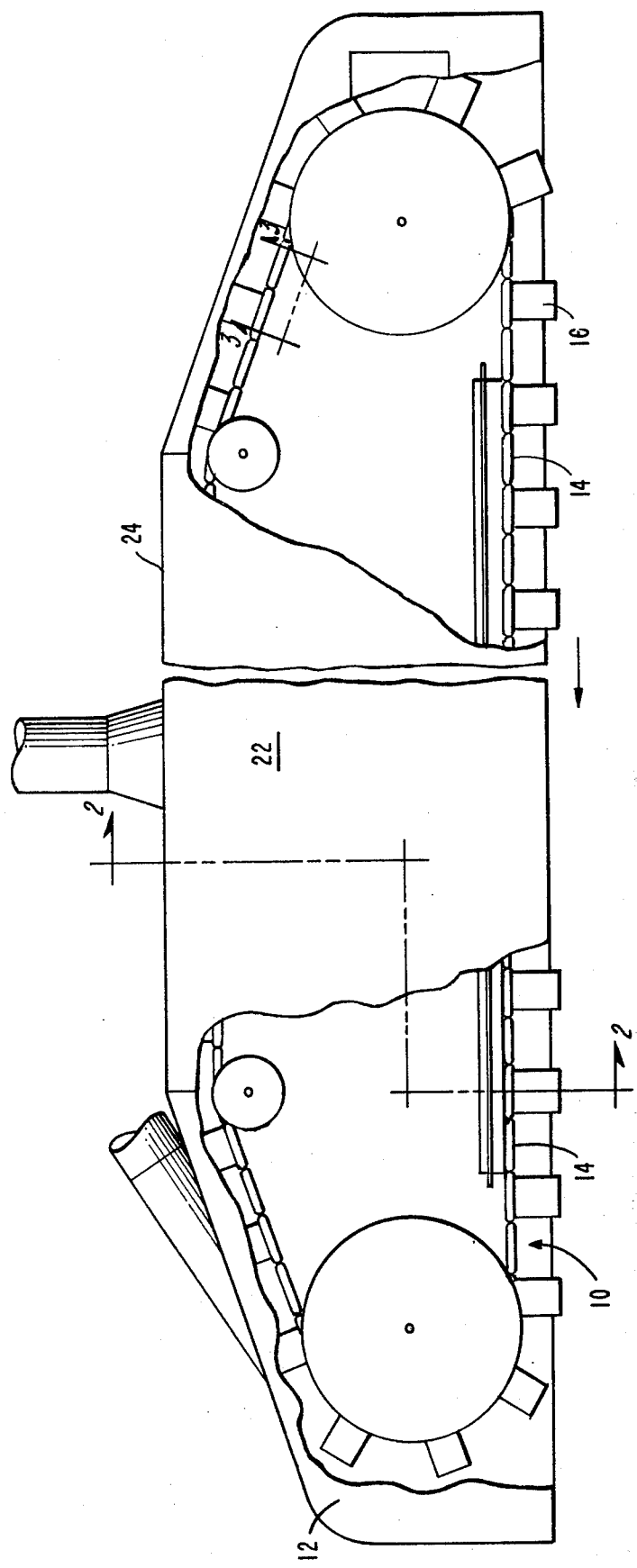
FIG. 1 is a side view, partially broken away, showing the upper portion of an electrostatic spray cabinet mounting the high-speed conveyor and chucking arrangement of this invention.

Referring to FIG. 1, one will better appreciate the endless loop-type of high-speed conveyor 10 assembly that is mounted in the upper cabinet portion 12 of, preferably, an electrostatic spray booth not completely shown. As is indicated above, however, electrostatic methods of coating are not critical and this transfer and associated apparatus may be employed equally well in other spraying environments. Examples of such include water or solvent emulstion spray techniques or simple dry powder systems.

The conveyor 10 is composed of a plurality of interconnected links 14 forming an endless loop which is threaded around a system of rollers some or all of which may function to drive the conveyor itself. As can be seen, the lower-most flight of the conveyor moves from a position, for our purposes a bottle pick-up area, at the extreme right of the FIG. 1 to a second position, in this case a bottle release area at the extreme left of the FIG. 1. And, of course, the upper return conveyor flight simply returns each conveyor portion to the noted first position.

Figure 2:
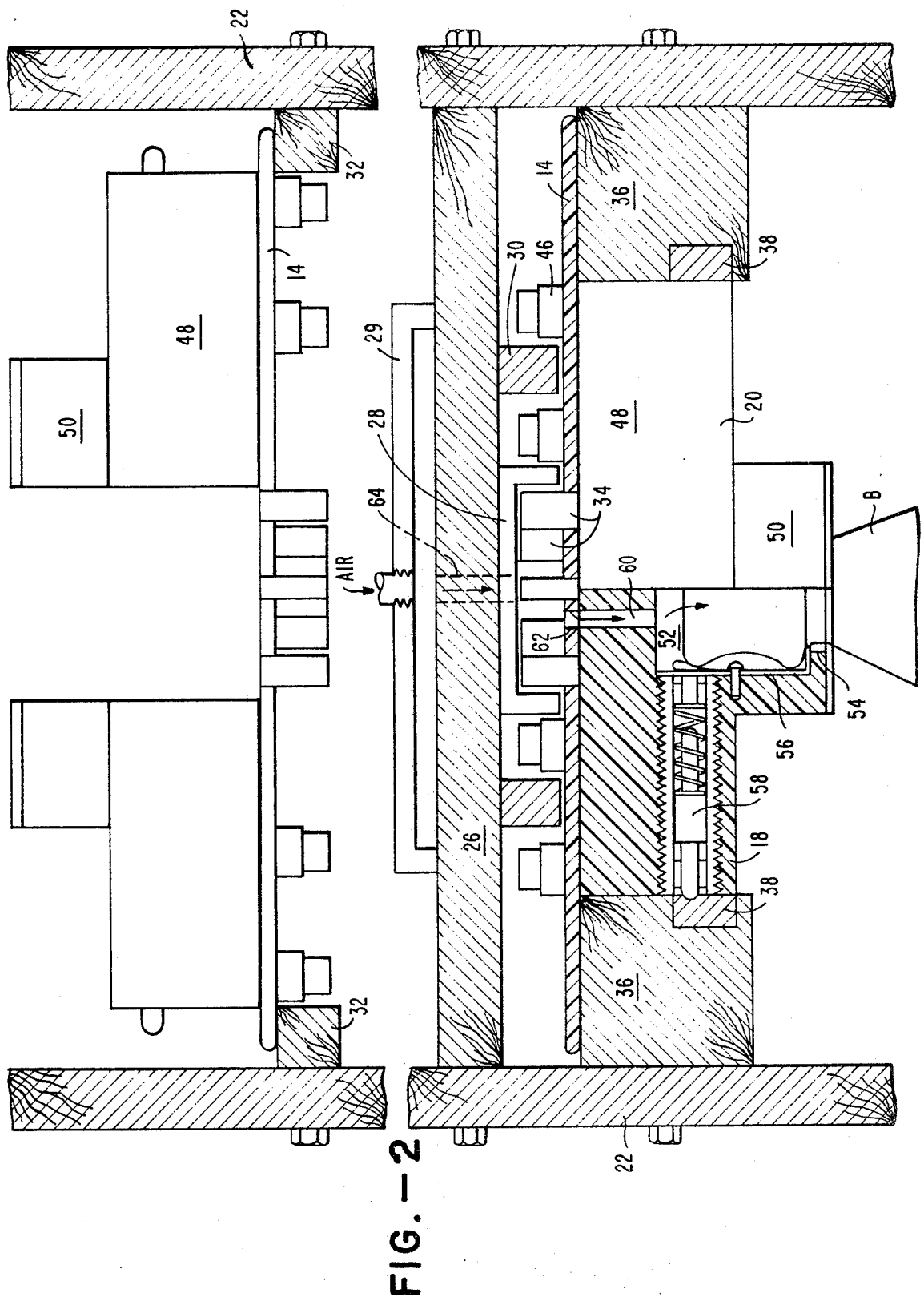
FIG. 2 is an enlarged cross-sectional view taken along line 2—2 in FIG. 1 and also broken for reasons of space limitations.

Also, as is apparent from FIG. 1, at selected points along the conveyor 10 and attached to the links 14 thereof are chucking arrangements 16. As is explained hereinafter, in more detail, these chucks are comprised of separate independently movable mating sections 18 and 20 (FIG. 2). These sections alternately open and close at the second and first positions, respectively, in such fashion as to grasp and retain a bottle prior to and during its passage through the spray booth and thereafter release it for further processing.

The cabinet 12 is, of course, comprised of a plurality of walls including the two side walls 22 and top end wall 24. The bottom is open to the spray booth to accommodate the passage of the bottles therethrough. Positioned between the sidewalls 22 is a baffle member 26 best seen in FIG. 2 and which extends substantially the full length of the conveyor adjacent the lower flight thereof. This baffle member serves, not only to separate the conveyor flights, but also to mount cams 28, channel member 30 in close association with the underside of lowermost conveyor flight and the upper air manifold assembly 29. Likewise, the cabinet side walls 22 have mounted thereon support bars 32 which retain and maintain the conveyor in a substantially horizontal orientation along its upper flight.

Sidewalls 22 also mount a pair of guide members 36 which are adapted to retain chuck sections 18 and 20 in the closed position around a bottle (FIG. 2) as it passes through the electrostatic spray booth. These also support the lower conveyor flight such that the underside of conveyor 14 and particularly the hinge projections 34 are in close association with the channel member 28 and are substantially enclosed thereby. Further, because of the preferred electrostatic means of deposition, such guides include electrically conductive strips or elements 38 which cooperate with similar conductive circuitry in the chuck sections themselves.

It is appropriate here also to point out that the materials of construction of the cabinet portions, conveyor links, chuck elements and any other component part making up or passing through the coating area of the spray booth should be non-conductive in nature. Otherwise, polymeric deposition on these various parts would be inevitable due to the preferred mode of deposition (i.e., electrostatic) and thus would be detrimental to continuous and effective operation of the apparatus. In the event other spray techniques are selected for employment, these requirements may be altered and modified accordingly.

As indicated, the conveyor links 14 as may be better seen in FIG. 3, include hinge projections 34 that provide for their interconnection by means of, for example, pins 40. Such links are also laterally slotted as at 42 to accommodate fastening means 44. The latter extend through the slots 42 and engage independently movable chuck sections 18 and 20, guiding same in their respective lateral movements. The headed portions 46 of fasteners 44 also act as cam followers and actively engage the cam members 30 at both of the mentioned first and second positions where lateral movement of the sections 18, 20 is required to effect the closing and opening of the chuck.

The mating chuck sections 18 and 20 include a main body portion 48 and a neck portion 50. A cavity 52 having an opening 54 is formed in the mentioned neck portion and is shaped to accommodate the finish of typical bottleware (B). Thus, when sections 18 and 20 are closed, the bottleware (B) is firmly supported in an upright position and may be moved in this manner through the mentioned booth and spraying area. Note also, that the cavity interior includes a conductive copper or similar insert 56 and the neck 50 is capped with a metal plate 58 both of which are in contact with the bottle (B). Likewise, the insert is in contact with the conductive pin mechanism 58 which via strips 38 and spring finds its way to "ground" outside of the cabinet.

Another principal feature of the chuck arrangement is a fluid purging system that enables the introduction under positive pressure into the bottle interior of a fluid purging medium, preferably air. The introduction of same is accomplished by means of a passageway 60 extending from the bottom of each chuck section to the cavity 52. These passageways aligned with openings 62 in links 14 when the chuck sections are closed and are further supplied via a plurality of passage ways 64 extending through the baffle and channel members 26 and 28 from any suitable air or similar fluid source, not shown. This supply of purge gas, of course, effectively prevents the migration of polymeric coating onto the bottle finish area or to the interior thereof and thus preserves the glass integrity in these protected areas.

As is also shown in FIGS. 2 and 4, the respective mating chuck sections include tongue and groove facings to provide for more positive seating between the two halves. It is anticipated that the noted system and arrangement of purging the finish of the ware is desirable and necessary for the production of suitably coated bottles regardless of the spraying technique employed.

We claim:

1. A chuck assembly principally composed of a non-conductive material and which includes at least two separably mating sections having a cavity formed therein and shaped to receive and retain an extended article portion and at least one passageway positioned remotely from the opening of said cavity but extending to the cavity from the exterior of said assembly and adapted to accept a fluid medium to purge said cavity and wherein said sections are movably affixed to means that enables such to be transversely positionable with respect thereto.

2. A chuck assembly according to claim 1 wherein said assembly is further provided with an internally positioned conductive circuit extending from an exposed position.

* * * * *